United States Patent [19]
Call et al.

[11] Patent Number: 5,671,296
[45] Date of Patent: Sep. 23, 1997

[54] METHOD OF ELECTRONICALLY PROCESSING A QUANTIZED IMAGE

[75] Inventors: Roger William Call, Salt Lake City; Dennis Carl Pulsipher, Farmington, both of Utah

[73] Assignee: Unisys Corporation, Blue Bell, Pa.

[21] Appl. No.: 763,922

[22] Filed: Dec. 12, 1996

Related U.S. Application Data

[63] Continuation of Ser. No. 551,691, Nov. 1, 1995, abandoned, which is a continuation of Ser. No. 196,604, Feb. 15, 1994, abandoned.

[51] Int. Cl.[6] .................................. G06K 9/36; G06K 9/40
[52] U.S. Cl. .............................. 382/251; 382/254; 382/298
[58] Field of Search .................................. 382/205, 260, 382/300, 251, 298, 254

[56] References Cited

U.S. PATENT DOCUMENTS

| | | | |
|---|---|---|---|
| 4,281,312 | 7/1981 | Knudson | 382/27 |
| 4,303,947 | 12/1981 | Stoffel | 382/300 |
| 4,648,119 | 3/1987 | Wingfield et al. | 382/27 |
| 4,703,353 | 10/1987 | David | 382/300 |
| 4,783,841 | 11/1988 | Crayson | 382/56 |
| 4,853,794 | 8/1989 | Fukumoto et al. | 382/300 |
| 4,864,413 | 9/1989 | Sasaki | 382/298 |
| 4,875,173 | 10/1989 | Nakajima | 382/298 |
| 4,947,446 | 8/1990 | Jutand et al. | 382/27 |
| 4,982,342 | 1/1991 | Moribe et al. | 382/27 |
| 5,101,445 | 3/1992 | Call et al. | 382/27 |
| 5,148,499 | 9/1992 | Fukuda | 382/298 |
| 5,159,666 | 10/1992 | Fukuda | 382/298 |
| 5,243,433 | 9/1993 | Hailey | 348/240 |
| 5,384,867 | 1/1995 | Barnscex et al. | 382/56 |
| 5,491,761 | 2/1996 | Kim | 382/254 |
| 5,579,418 | 11/1996 | Williams et al. | 382/300 |

OTHER PUBLICATIONS

Lewis, "An Accurate LNS Arithmetic Unit Using Interleaved Memory Function Interpolator", Computer Arithmetic Symposium, '93.

*Primary Examiner*—Leo Boudreau
*Assistant Examiner*—Anthony H. Kahng
*Attorney, Agent, or Firm*—Charles J. Fassbender; Mark T. Starr; Steven R. Petersen

[57] ABSTRACT

A first set of input index signals represents a row-column array of quantized pixels; and each input index signal in the first set represents a rectangular non-overlapping quantized pixel group which is aligned to a particular row and a particular column. By repeatedly performing three steps on different pairs of the input index signals in the first set, a second set of index signals is generated wherein a respective index signal exists for each individual pixel in the array and by which the image can be filtered. These three steps are: 1) selecting a pair of input index signals in the first set such that the two quantized pixel groups which the selected index signals represent are adjacent to each other in the array; 2) forming an address signal by combining the two selected input index signals; and 3) reading a memory with the address signal to thereby obtain an output index signal. That output index signal represents an overlapping group of pixels which—a) consist of pixels from the two adjacent quantized pixel groups, and b) have been requantized.

13 Claims, 4 Drawing Sheets

METHOD OF ELECTRONICALLY PROCESSING A QUANTIZED IMAGE

This is a continuation of application Ser. No. 08/551,691 filed on Nov. 1, 1995 now abandoned, which is a continuation of Ser. No. 08/196,604 filed on Feb. 15, 1994 now abandoned.

BACKGROUND OF THE INVENTION

This invention relates to methods and circuits for electronically processing a quantized image whereby the image may be filtered and enhanced.

In the prior art, a digital image conventionally consists of a rectangular array of pixels. This array has a predetermined number of rows and a predetermined number of columns; and at each row-column location, one pixel exists which gives the light intensity at that location. For example, each pixel can be an eight bit binary encoded digital signal, with the magnitude of the signal being proportional to the light intensity.

Also in the prior art, it is conventional to—a) partition the pixel array into non-overlapping groups of pixels, b) quantize each of those pixel groups into a respective standard quantized pixel group that is selected from a predetermined set, and c) represent each of the quantized pixel groups with a respective index signal. By these three operations, data compression is achieved.

For example, the pixel array can be partitioned into non-overlapping groups where each pixel group is in a three-by-three square of nine pixels. Then, if each pixel in a group is an eight bit digital signal, a complete pixel group will consist of eight bits times nine, or seventy-two bits.

By comparison, suppose a predetermined set of one-hundred twenty-eight standard quantized pixel groups is predefined where each such group is represented by a seven bit index signal. Then, if a particular group of nine pixels in the array is quantized to one of the standard quantized pixel groups, only seven bits are needed to represent that quantized pixel group.

From the above it follows that an entire quantized pixel array is represented by a certain set of index signals wherein each index signal identifies a standard quantized pixel group at a particular location in the array which does not overlap any other pixel group. That set of index signals can then be used to directly reproduce the quantized image itself. However, that set of index signals can not be used to directly enhance the quantized image by filtering.

In particular, U.S. Pat. No. 5,101,445 (which is assigned to the present assignee) discloses a method of enhancing a digital image through a variety of linear and non-linear filtering operations. But, to perform those filtering operations, a different set of index signals must first be generated wherein a respective index signal exists for each individual pixel in the array. Consequently, this set of index signals represents groups of pixels which overlap each other. See for example FIG. 1 of U.S. Pat. No. 5,101,445 wherein two of the above overlapping pixel groups are illustrated.

Accordingly, a primary object of the invention is to provide a method and circuit by which a first set of index signals, which represent non-overlapping quantized pixel groups in an image array, is transformed into a second set of index signals which represent overlapping pixel groups by which the image can be filtered.

BRIEF SUMMARY OF THE INVENTION

To practice the present invention, one begins with a set of input index signals which together represent a row-column array of quantized pixels. Individually, each input index signal represents a rectangular non-overlapping quantized pixel group which is aligned to a particular row and a particular column. Then, in accordance with the present invention, a pair of input index signals are selected such that the two quantized pixel groups which the selected index signals represent are adjacent to each other in the array. Then an address signal is formed by combining the two selected input index signals. Then a memory is read with the address signal to thereby obtain an output index signal; and that output index signal represents an overlapping group of pixels which—a) consists of pixels from the two adjacent quantized pixel groups, and b) have been requantized.

By repeatedly performing the above three steps on different pairs of the input index signals, a second set of index signals is generated wherein a respective index signal exists for each individual pixel in the array and by which the image can be filtered.

BRIEF DESCRIPTION OF THE DRAWINGS

FIGS. 4A and 4B together illustrate another embodiment for the overlapping index signal generator of FIGS. 1 and 2.

DETAILED DESCRIPTION

Figure 1:
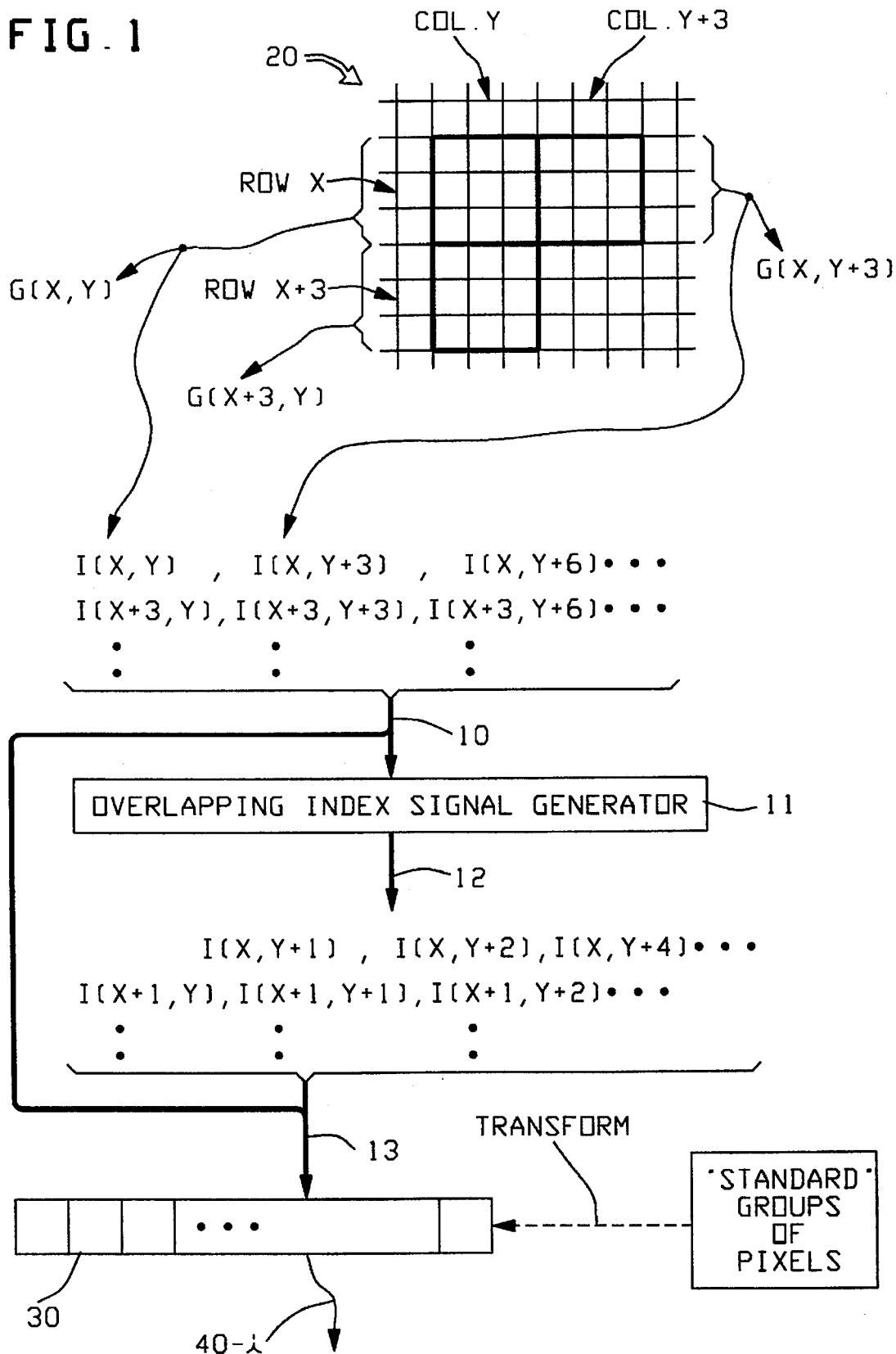
FIG. 1 is a schematic diagram which provides an overview of how an image is processed with the present invention.

Referring now to FIG. 1, reference numeral 10 identifies a set of input index signals, I(X,Y), I(X,Y+3), etc.; and each of these signals represents a quantized group of pixels from a pixel array 20 having a predetermined number of rows and columns. The particular input index signal I(X,Y) represents a quantized pixel group G(X,Y) which is aligned to a row X and a column Y in the pixel array 20. Similarly, the input index signal I(X,Y+3) represents a quantized pixel group G(X,Y+3) which is aligned to row X and column Y+3; the input index signal of I(X+3,Y) represents a quantized pixel group G(X+3,Y) which is aligned to row X+3 and column Y in the array; etc.

In FIG. 1, the aligning of a particular pixel group with a particular row and column is achieved by centering the pixel group with that row and column.

Each of the quantized pixel groups which the input index signals represent consist of nine pixels, and those nine pixels are arranged in three by three subportions of the array 20. Consequently, the input index signals I(X,Y) and I(X,Y+3) represent two pixel groups G(X,Y) and G(X,Y+3) which have adjacent columns; and, the index input index signals I(X,Y) and I(X+3,Y) represent two pixel groups G(X,Y) and G(X+3,Y) which have adjacent rows.

From the above it follows that the set 10 of input index signals in FIG. 1 represents the entire pixel array 20 which has been partitioned into non-overlapping quantized pixel groups. To reconstruct that pixel array, the pixel groups which are represented by the index signals 10 need only be placed in alignment with their respective row and column.

Now, in accordance with the present invention, the set of input index signals 10 is sent to a circuit 11 which is herein called an overlapping index signal generator; and it operates to generate a set 12 of output index signals. Each output index signal represents a three by three group of pixels that—a) overlaps at least two of the quantized pixel groups which the input index signals represent, and b) have been requantized. One such output index signal is generated for each possible three by three overlapping group.

For example, consider the output index signal I(X,Y+1). That output index signal represents a three by three group of pixels which is aligned with row X and column Y+1. Such a pixel group will overlap the two pixel groups G(X,Y) and G(X,Y+3) as represented by the input index signals I(X,Y) and I(X,Y+3). Likewise, the output index signal I(X+1,Y+1) represents a three by three group of pixels that is aligned to row X+1 and column Y+1, and it will overlap the four pixel groups which are represented by the input index signals I(X,Y), I(X,Y+3), I(X+3,Y) and I(X+3,Y+3).

After the set 12 of output index signals have been generated, they are combined with the input index signals to form a full set of index signals 13 wherein one such signal exists for each row-column pair in the pixel array. Then, each index signal in the set 13 is transformed one at a time by a memory 30 to a single pixel 40-i. In this transformation step, index I(X,Y) is used to retrieve a single pixel from memory 30; index I(X,Y+1) is used to retrieve another single pixel from memory 30; etc. Each pixel 40-i which a particular index retrieves from memory 30 is the result which is obtained by performing a predetermined transform operation on the standard quantized group of pixels which the index represents. This transformation step is identical to a transformation step which is described in detail in U.S. Pat. No. 5,101,445 as cited herein in the BACKGROUND OF THE INVENTION; and it enables the pixel array to be enhanced by a wide variety of linear and/or non-linear filter operations. Several filtering examples are provided in FIGS. 2 through 6 of U.S. Pat. No. 5,101,445.

However, in U.S. Pat. No. 5,101,445, every index signal in the full set 13 is generated by quantizing a corresponding group of pixels; and such a quantizing operation is inherently complex and thus time consuming to perform. By comparison, in the process of FIG. 1, only the set 10 of non-overlapping input index signals is generated by quantizing respective pixel groups, and all of remaining index signals in the set 12 are generated much more quickly by the circuit 11 from the input index signals.

Figure 2:
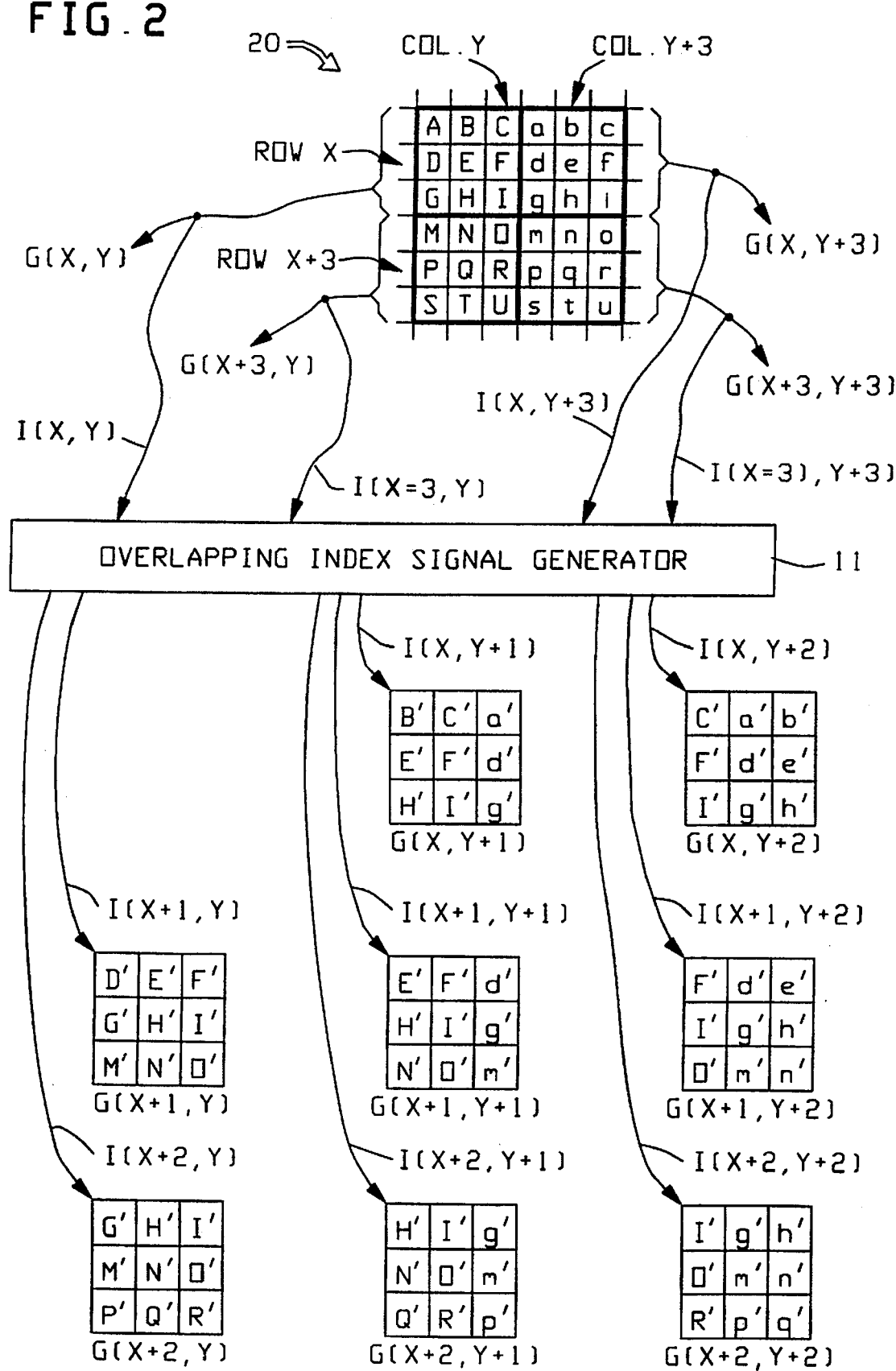
FIG. 2 shows in greater detail the operation of an overlapping index signal generator which occurs in FIG. 1.

Turning now to FIG. 2, a preferred embodiment of the circuit 11 will be described in detail. At the top of FIG. 2, four quantized pixel groups G(X,Y), G(X,Y+3), G(X+3,Y) and G(X+3,Y+3) are shown. Pixel group G(X,Y) consists of nine quantized pixels "A" thru "I" which are arranged in a matrix of three rows and three columns. Also, this pixel group G(X,Y) is aligned to row X and column Y in the pixel array; and it is represented by the input index signal I(X,Y).

Similarly, pixel group G(X,Y+3) consists of nine quantized pixels "a" thru "i"; pixel group G(X+3,Y) consists of nine quantized pixels "M" thru "U"; and pixel group G(X+3,Y+3) consists of nine quantized pixels "m" thru "u". Those pixel groups G(X,Y+3), G(X+3,Y) and G(X+3,Y+3) respectively are aligned with row X and column Y+3, row X+3 and column Y, row X+3 and column Y+3; and they respectively are represented by input index signals I(X,Y+3), I(X+3,Y), I(X+3,Y+3).

From the four input index signals I(X,Y), I(X,Y+3), I(X+3,Y) and I(X+3,Y+3) the circuit 11 produces eight output index signals I(X,Y+1), I(X,Y+2), I(X+1,Y), I(X+1,Y+1), I(X+1,Y+2), I(X+2,Y), I(X+2,Y+1) and I(X+2,Y+2). Output index signal I(X,Y+1) represents a three by three pixel group G(X,Y+1) which is aligned to row X and column Y+1 and which has been requantized. Thus the pixel group G(X,Y+1) which signal I(X,Y+1) represents is the result of requantizing the pixels B, C, a, E, F, d, H, I, g; and that requantized result is indicated in FIG. 2 by appending a prime symbol to each of the pixels B, C, etc.

For example, suppose index I(X,Y) has one particular value which represents the group of pixels "A" thru "I" as shown in Table 1 below, and suppose that index I(X,Y+3) has another particular value which represents the group of pixels "a" thru "f" as shown in Table 2. In that case, the resulting pixel group G(X,Y+1) which is aligned to row X and column Y+1 will be as shown in Table 3.

TABLE 1

| | | |
|---|---|---|
| A = $(01)_{16}$ | B = $(02)_{16}$ | C = $(03)_{16}$ |
| D = $(01)_{16}$ | E = $(02)_{16}$ | F = $(03)_{16}$ |
| G = $(01)_{16}$ | H = $(02)_{16}$ | I = $(03)_{16}$ |

TABLE 2

| | | |
|---|---|---|
| a = $(04)_{16}$ | b = $(05)_{16}$ | c = $(06)_{16}$ |
| d = $(04)_{16}$ | e = $(05)_{16}$ | f = $(06)_{16}$ |
| g = $(04)_{16}$ | h = $(05)_{16}$ | i = $(06)_{16}$ |

TABLE 3

| | | |
|---|---|---|
| B = $(02)_{16}$ | C = $(03)_{16}$ | a = $(04)_{16}$ |
| E = $(02)_{16}$ | F = $(03)_{16}$ | d = $(04)_{16}$ |
| H = $(02)_{16}$ | I = $(03)_{16}$ | g = $(04)_{16}$ |

Now in general, the resulting pixel group of Table 3 will not match any pixel group which is represented by any particular value for the input index signals. Consequently, the resulting pixel group of Table 3 is "requantized" to the one pixel group that is represented by a particular value of the input index signals, and which most closely matches the Table 3 pixel group.

Likewise, the output index I(X,Y+2) represents a three by three pixel group G(X,Y+2) which is aligned to row X and column Y+2 and which has been requantized; the output index signal I(X+1,Y) represents a three by three pixel group G(X+1,Y) which is aligned to row X+1 and column Y and which has been requantized; etc. All of these pixel groups which the output index signals represent are shown in FIG. 2.

Figure 3:
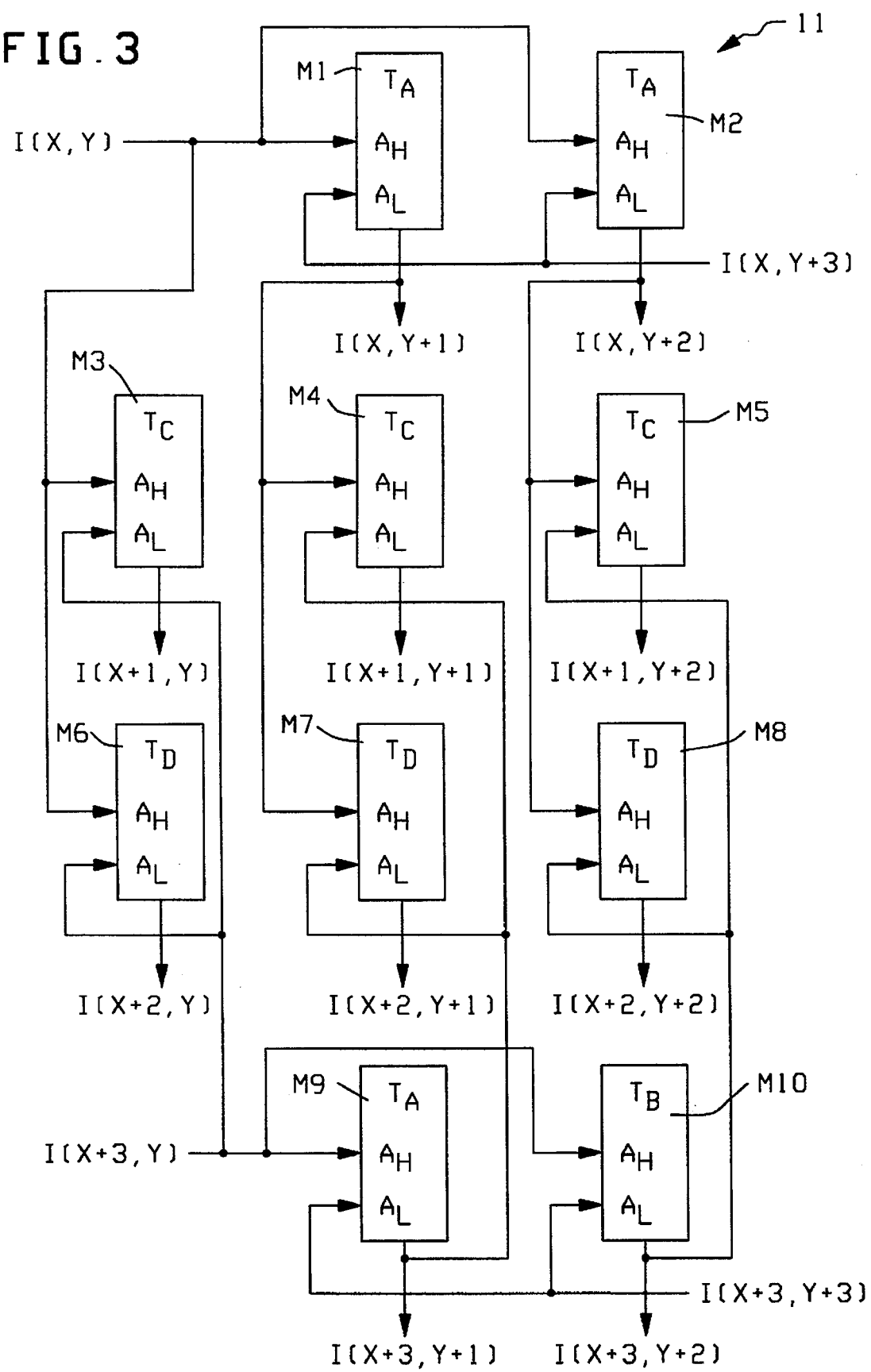
FIG. 3 is a detailed circuit diagram of one preferred embodiment for the overlapping index signal generator of FIGS. 1 and 2.

Referring next to FIG. 3, it shows a preferred internal structure for the FIG. 2 circuit 11. With this structure, the circuit 11 consists of ten memories M1 thru M10 which are interconnected to each other as FIG. 3 shows.

Each of the memories M1 thru M10 has a set of address terminals, one half of which are identified as $A_L$ and the other half of which are identified as $A_H$. In each memory, the $A_L$ terminals receive index signals which there form the least significant bits of an address for the memory; and the $A_H$ terminals receive index signals which there form the most significant bits of the address.

For example, in the memory M1, the $A_L$ terminals receive the input index signal I(X,Y+3) and the $A_H$ terminals receive the input index signal I(X,Y). Thus if the input index signal I(X,Y+3) consists of eight binary bits having a value $(57)_{16}$ and the input index signal I(X,Y) consists of eight binary bits having a value $(39)_{16}$, then the memory M1 will be addressed at location $(3957)_{16}$.

Stored within the memory M1 are the output index signals I(X,Y+1), and those signals are read from the memory M1 in response to the address on the terminals $A_H$ and $A_L$. As an example of this, consider again the above case where $A_L=I(X,Y+3)=(57)_{16}$ and $A_H=I(X,Y)=(39)_{16}$.

Index $I(X,Y+3)=(57)_{16}$ represents the quantized group of pixels $G(X,Y+3)$ of FIG. 2 where the pixels "a" thru "i" have one particular set of numerical values herein called $V_{57}$. Likewise, index $I(X,Y)=(39)_{16}$ represents the quantized group of pixels $G(X,Y)$ of FIG. 2 where the pixels "A" thru "I" have another particular set of values herein called $V_{39}$. For those particular pixel values $V_{57}$ and $V_{39}$, the overlapping requantized group of pixels $G(X,Y+1)$ will also have some particular set of values $V_{3957}$ which is represented by the index $I(X,Y+1)$, and that index is stored in the memory M1 at address $(3957)_{16}$.

Similarly, the memory M2 in FIG. 3 is addressed just like the memory M1. However, at each addressed location, the memory M2 stores a particular value for the index $I(X,Y+2)$ which represents a particular pixel group $G(X,Y+2)$. For example, at address $(3957)_{16}$, the memory M2 stores a value for the index $I(X,Y+2)$ which represents the particular group of pixels $G(X,Y+2)$ that occurs when the pixels "a"–"i" have the set of values $V_{57}$ and the pixels "A"–"I" have the set of values $V_{39}$.

Likewise, the memories M3 and M6 both receive the input index signal $I(X+3,Y)$ on the low order half of their address terminal $A_L$, and they both receive the input index signal $I(X,Y)$ on the high order half of their address terminals $A_H$. In memory M3, each location which is addressed by a particular value for the two input indexes $I(X,Y)$ and $I(X+3,Y)$ stores a corresponding particular value for the output index $I(X+1,Y)$. Similarly, in memory M6, each location which is addressed by a particular value the two input indexes $I(X,Y)$ and $I(X+3,Y)$ stores a corresponding value for the output index $I(X+2,Y)$.

From the above it is seen that the values of the index signals which are stored at any one particular location in the memories M1, M2, M3 and M6 are all different. In that respect, the memories M1, M2, M3 and M6 constitute four different memory types $T_A$, $T_B$, $T_C$, and $T_D$; and these memory types are labeled in FIG. 3.

By comparison, each of the remaining memories M4 M5, M7, M8, M9 and M10 in FIG. 3 is a repetition of one of the above four memory types. Specifically, memories M4 and M5 are type $T_C$; memories M7 and M8 are type $T_D$; memory M9 is type $T_A$; and memory M10 is type $T_B$.

To explain further why the memories M1 and M9 are the same, consider that memory M1 is addressed by the input index signals $I(X,Y)$ and $I(X,Y+3)$, whereas memory M9 is addressed by the input index signals $I(X+3,Y)$ and $I(X+3,Y+3)$. In the top half of FIG. 3, the pixel groups which those index signals represent are shown. Inspection of FIG. 3 shows that the pair of pixel groups $G(X,Y)$ and $G(X,Y+3)$ have the same spacial relationship to each other as the pair of pixel groups $G(X+3,Y)$ and $G(X+3,Y+3)$. Therefore, when the pair of pixel groups $G(X,Y)$ and $G(X,Y+3)$ and the pair of pixel groups $G(X+3,Y)$ and $G(X+3,Y+3)$ have the same set of values, than those pairs of pixel groups are identical.

By similar reasoning, it can be seen why any two memories in FIG. 3 which are labeled as the same type can in fact be the same. For example, memory M3 is addressed by two input index signals which represent one pair of pixel groups $G(X,Y)$ and $G(X+3,Y)$, whereas memory M4 is addressed by two other input index signals which represent a pair of pixel groups $G(X,Y+1)$ and $G(X+3,Y+1)$. But those two pairs of pixel groups are identical when $I(X,Y)=I(X,Y+1)$ and $I(X+3,Y)=I(X+3,Y+1)$.

After the FIG. 3 circuit completes its operation on the four input index signals $I(X,Y)$, $I(X,Y+3)$, $I(X+3,Y)$ and $I(X+3,Y+3)$ by generating the ten output index signals from the memories M1–M10, a new set of four other input index signals is sent to that circuit and a corresponding set of ten more output index signals is generated. To proceed along the same rows, the input index signals $I(X,Y)$, $I(X,Y+3)$, $I(X+3,Y)$ and $I(X+3,Y+3)$ would respectively be replaced with $I(X,Y+3)$, $I(X+3,Y+6)$, $I(X+3,Y+3)$ and $I(X+3,Y+6)$; whereas to proceed along the same columns, the input index signals would respectively be replaced with $I(X+3,Y)$, $I(X+3,Y+3)$, $I(X+6,Y)$ and $I(X+6,Y+3)$.

A major feature of the FIG. 3 circuit is the speed by which the output index signals are generated. In particular, the output index signals $I(X,Y+1)$, $I(X,Y+2)$, $I(X+1,Y)$, $I(X+2,Y)$, $I(X+3,Y+1)$, and $I(X+3,Y+2)$ are all generated in parallel in the time interval which it takes to read one memory; and the remaining output index signals are generated in parallel in the time interval which it takes to read two memories. This generation of the output index signals by the FIG. 3 circuit involves no quantizing or requantizing time at all.

One preferred method and one preferred circuit, for processing an image which is comprised of a row-column array of quantized pixels, has now been described in detail. In addition, however, various changes and modifications can be made to those details without departing from the gist of the invention.

As one particular modification to the FIG. 3 circuit, a) the memories M4, M5, M7, M8, M9, and M10 can be eliminated, and b) all of the output index signals can be generated by sequential use of the remaining memories M1, M2, M3, and M6. For example, the memories M1 and M3 can first be used to generate all of the output index signals for row X (i.e.—signals $I(X,Y+1)$ and $I(X,Y+2)$, signals $I(X,Y+4)$ and $I(X,Y+5)$, etc.). Then the memories M1 and M3 can be used to generate all of the output index signals for row X+3 (i.e.—signals $I(X+3,Y+1)$ and $I(X+3,Y+2)$, signals $I(X+3,Y+4)$ and $I(X+3,Y+5)$, etc.). Then the memories M3 and M6 can be sequentially addressed by pairs of the above signals to generate all of the output index signals for rows X+1 and X+2.

Alternatively, the memories M3 and M6 can be used first to generate all of the output index signals for column Y (i.e.—signals $I(X+1,Y)$ and $I(X+2,Y)$, signals $I(X+4,Y)$ and $I(X+5,Y)$, etc. Then the memories M3 and M6 can be used to generate all of the output index signals for column Y+3 (i.e.—signals $I(X+1,Y+3)$ and $I(X+2,Y+3)$, signals $I(X+4,Y+3)$ and $I(X+5,Y+3)$, etc.). Then the memories M1 and M2 can be sequentially addressed by pairs of the above signals to generate all of the output index signals for columns Y+1 and Y+2.

As another modification, all of the pixel groups can be aligned to the rows and columns of the array 20 in a manner which differs from that shown in FIGS. 1 and 2. For example, as shown in the figures, the pixel group $G(X,Y)$ has its center pixel located at row X and column Y; but as an alternative, the pixel group $G(X,Y)$ could have its top left pixel located at row X and column Y. In that event, all other pixel groups would be similarly aligned. Likewise, the pixel group $G(X,Y)$ can have any predetermined one of its pixels located at row X and column Y, and all other pixel groups would be similarly aligned.

As still another modification, the number of pixels in each pixel group can be changed from nine to some other predetermined number. In general, each pixel group is rectangular and has $P_R$ pixels per row and $P_C$ pixels per column. Thus, in general, the FIG. 3 circuit will be a matrix of $P_C+1$ rows where the first row contains $P_R-1$ memories, rows two thru $P_C$ each contain $P_R$ memories, and row $P_C+1$ contains $P_R-1$ memories.

In the above described modification of the FIG. 3 circuit, the total number of memories can be reduced to $P_R-1+P_C+1$ by retaining just the memories of the top row and the left column, and by sequentially using those retained memories to generate all of the output index signals. This sequential use of the top row and left column memories is just an extension of how the memories M1, M2, M3, and M6 of the FIG. 3 circuit are sequentially used to generate all of the FIG. 3 output index signals.

Figure 4A:
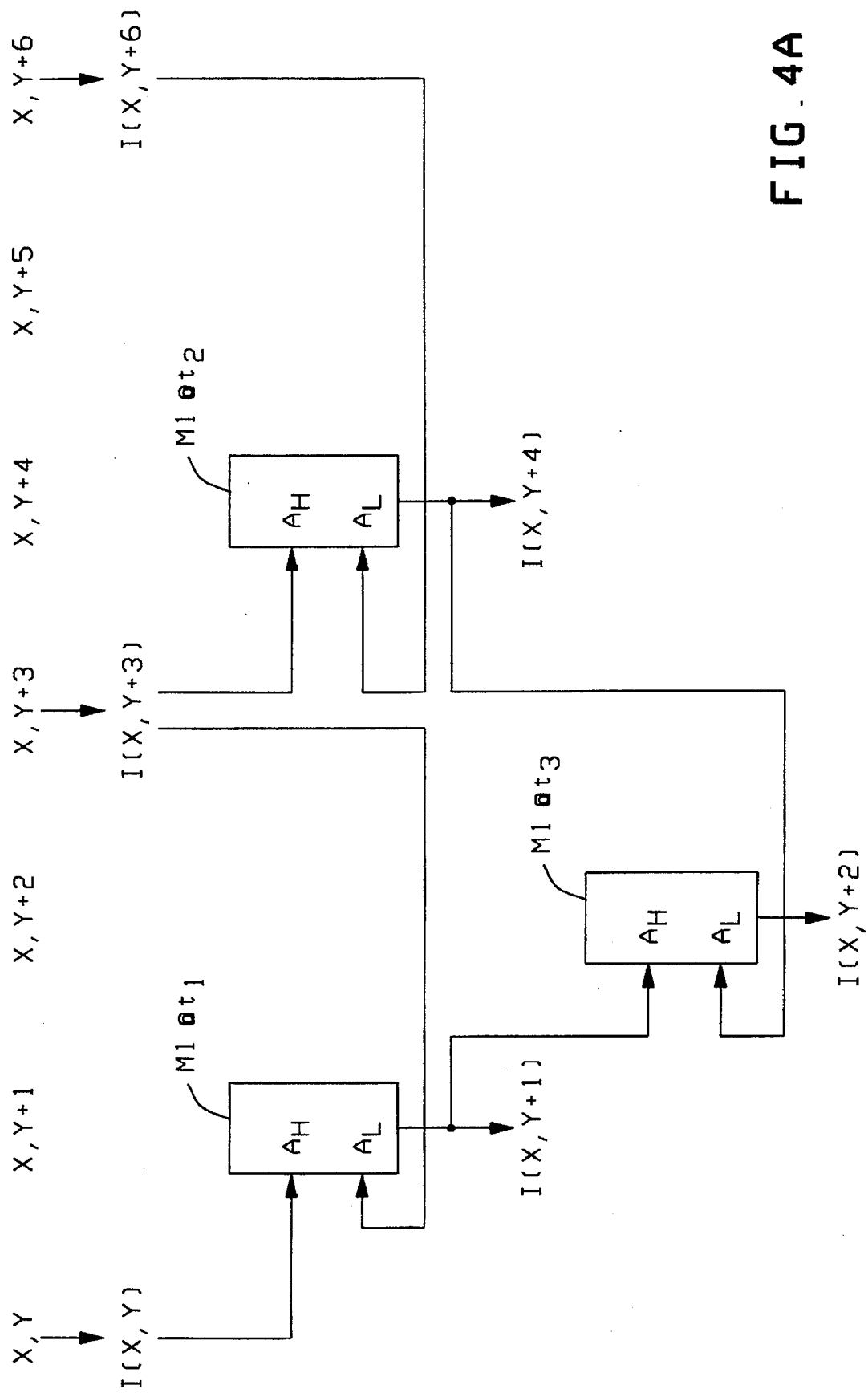

In yet another alternative method and circuit, as shown in FIGS. 4A and 4B, the total number of memories is reduced to just two. Considering first FIG. 4A, there the symbols X,Y and X,Y+1 and . . . and X,Y+6 represent respective row-column intersections in a pixel array. Also in FIG. 4A, the input index signals I(X,Y), I(X,Y+3), and I(X,Y+6) represent respective three by three pixel groups like those previously described in conjunction with FIGS. 1–3.

Now in FIG. 4A, all of the output index signals for row X are generated by the sequential use of the single memory M1 from the FIG. 3 circuit. Specifically, at time $t_1$, the pair of input index signals I(X,Y) and I(X,Y+3) are used to form an address for the memory M1 and thereby read the output index I(X,Y+1) from the memory. Thereafter, at time $t_2$, the pair of input index signals I(X,Y+3) and I(X,Y+6) are used to form an address for the memory M1 and thereby read the output index signal I(X,Y+4) from the memory. Then, at time $t_3$, the above two output index signals which were read at times $t_1$ and $t_2$ are used to form an address for the memory M1 and thereby read the output signal I(X,Y+2).

By the above sequence of three reads, all of the output index signals are generated for row X between columns Y and Y+3; and by repeating the sequence in a similar fashion, all of the output index signals for the entire row X can be generated. For example, all of input index signals I(X,Y), I(X,Y+3), I(X,Y+6), etc. can first be used in successive pairs to address the memory M1 and thereby generate the output index signals I(X,Y+1), I(X,Y+4), I(X,Y+7), etc.; and those output index signals can then be used in successive pairs to address the memory M1 and thereby generate the remaining output index signals I(X,Y+2), I(X,Y+5), I(X,Y+8), etc. In like fashion, all of the output index signals can be generated for rows X+3, X+6, etc.

Similarly in FIG. 4B, all of the output index signals for column Y are generated by the sequential use of the single memory M3 from the FIG. 3 circuit. Specifically, at time $t_4$, the pair of input index signals I(X,Y) and I(X+3,Y) are used to form an address for the memory M3 and thereby read the output index I(X+1,Y) from the memory. Thereafter, at time $t_5$, the pair of input index signals I(X+3,Y) and I(X+6,Y) are used to form an address for the memory M3 and thereby read the output index signal I(X+4,Y) from the memory. Then, at time $t_6$, the above two output index signals which were read at times $t_4$ and $t_5$ are used to form an address for the memory M3 and thereby read the output signal I(X+2,Y).

By repeating the above sequence in a similar fashion, all of the output index signals for the entire column Y can be generated. For example, all of input index signals I(X,Y), I(X+3,Y), I(X+6,Y), etc. can first be used in successive pairs to address the memory M3 and thereby generate the output index signals I(X+1,Y), I(X+4,Y), I(X+7,Y), etc.; and those output index signals can then be used in successive pairs to address the memory M3 and thereby generate the remaining output index signals I(X+2,Y), I(X+5,Y), I(X+8,Y), etc. In like fashion, all of the output index signals can be generated for columns Y+3, Y+6, etc. Then, the output index signals in the columns Y, Y+3, Y+6, etc. which occur at any particular row $R_1$ can be used in successive pairs to address the memory M1 and thereby generate all of the output index signals for that row.

As a generalization of the above described sequence, suppose there are PR pixels per row in each pixel group and thus the input index signals for row X are I(X,Y), I(X,Y+$P_R$), I(X,Y+$2P_R$), etc. In that case, the input index signals are used in successive pairs to address the memory M1 and thereby generate the output index signals I(X,Y+1), I(X,Y+$P_R$+1), I(X,Y+$2P_R$+1), etc. Then those output index signals are used in successive pairs to address the memory M1 and thereby generate the output index signals I(X,Y+2), I(X,Y+$P_R$+2), I(X,Y+$2P_R$+2), etc. Then those output signals are used in successive pairs to address the memory M1 and thereby generate the output index signals I(X,Y+3), I(X,Y+$P_R$+3), I(X,Y+$2P_R$+3), etc. This sequential process continues until all of the output index signals for row X are generated. Likewise, if there are $P_C$ pixels per column in each pixel group, then the above sequential process is carried out in a similar fashion wherein memory M3 is used instead of memory M1 and it is initially addressed by the column Y input index signals I(X,Y), I(X+$P_C$,Y), I(X+$2P_C$,Y), etc.

Accordingly, it is to be understood that the present invention is not limited to the details of any one particular embodiment but is defined by the claims.

What is claimed is:

1. A method of electronically processing an input image which is comprised of a row-column array of pixels, said method including two initial steps a1–a2 and four subsequent steps b1–b4 of:

a1) forming, from a predetermined set of several quantized pixel groups, all possible pairs of said quantized pixel groups, where each quantized pixel group is rectangular with rows of $P_R$ pixels per row and columns of $P_C$ pixels per column;

a2) storing in a memory, output index signals for each of said pairs of said quantized pixel groups; where each output index signal represses an overlapping pixel group which consists of selected pixels from the corresponding pair of quantized pixel groups that have been requantized together; and thereafter, b1) partitioning said array of pixels from said input image into rectangular non-overlapping quantized pixel groups G(X,Y) which are aligned to a row X and a column Y, where each quantized pixel group G(X,Y) is selected from said set and is represented by an input index signal I(X,Y);

b2) selecting two input index signals such that the two quantized pixel groups which the selected input index signals represent are adjacent to each other in said array;

b3) forming an address signal with said two selected input index signals; and, b4) reading from said memory via said address signal, the output index signals that are stored therein for said two selected input index signals.

2. A method according to claim 1 wherein the two selected input index signals are I(X,Y) and I(X,Y+$P_R$) which represent two quantized pixel groups that have adjacent pixel columns in said array.

3. A method according to claim 2 wherein said reading step is performed on $P_R-1$ different memories, that provide respective output index signal $I(X,Y+1)$ thru $I(X,Y+P_R)$, each of which represents a separate overlapping group of pixels that is aligned to a different one of the pixel columns $Y+1$ thru $Y+P_R$.

4. A method according to claim 1 wherein the two selected input index signals are $I(X,Y)$ and $I(X+P_C,Y)$ which represent two quantized pixel groups that have adjacent pixel rows in said array.

5. A method according to claim 4 wherein said reading step is performed on $P_C-1$ different memories, that provide respective output index signals $(I(X+1,Y)$ thru $I(X+P_C,Y))$, each of which represents a separate overlapping group of pixels that is aligned to a different one of the pixel rows $X+1$ thru $X+P_C$.

6. A method according to claim 1 wherein said selecting, forming, and reading steps are repeated in a first sequence, a second sequence, and a third sequence;

with said first sequence forming a memory address with two input index signals $I(X,Y)$ and $I(X,Y+P_R)$, and reading an output index signal $I(X,Y+j)$, where j is an integer from 1 to $P_R$;

with said second sequence forming a memory address with two input index signals $I(X+P_C,Y)$ and $I(X+P_C,Y+P_R)$, and reading an output index signal $I(X+P_C,Y+j)$; and, with said third sequence forming a memory address with said two output index signals from said first and second sequence, and reading an output index signal $I(X+k,Y+j)$, where k is an integer from 1 to $P_C$.

7. A method according to claim 1 wherein said selecting forming, and reading steps are repeated in a first sequence, a second sequence, and a third sequence;

with said first sequence forming a memory address with two input index signals $I(X,Y)$ and $I(X+P_C,Y)$, and reading an output index signal $I(X+j,Y)$, where j is an integer from 1 to $P_C$;

with said second sequence forming a memory address with two input index signals $I(X,Y+P_R)$ and $I(X+P_C,Y+P_R)$, and reading an output index signal $I(X+j,Y+P_R)$; and, with said third sequence selecting the two output index signals from said first and second sequence, and reading an output index signal $I(X+j,Y+k)$ where k is an integer from 1 to $P_R$.

8. A method according to claim 1 wherein said selecting, forming, and reading steps are repeated in a first sequence, a second sequence, and a third sequence;

with said first sequence forming an address with two input index signals $I(X,Y)$ and $I(X,Y+P_R)$, and reading an output index signal $I(X,Y+1)$;

with said second sequence forming an address with two input index signals $I(X,Y+P_R)$ and $I(X+2P_R)$, and reading an output index signal $I(X,Y+P_R+1)$; and, with said third sequence forming an address with the two output index signals from said first and second sequence and reading an output index signal $I(X,Y+2)$.

9. A method according to claim 1 wherein said selecting forming, and reading steps are repeated in a first sequence, a second sequence, and a third sequence;

with said first sequence forming an address with two input index signals $I(X,Y)$ and $I(X+P_C,Y)$, and reading an output index signal $I(X+1,Y)$;

with said second sequence forming an address with two input index signals $I(X+P_C,Y)$ and $I(X+2P_C,Y)$, and reading an output index signal $I(X+P_C+1,Y)$; and, with said third sequence forming an address with the two output index signals from said first and second sequence and reading an output index signal $I(X+2,Y)$.

10. A method according to claim 6 wherein the reading step of said first sequence is performed on a set of $P_R-1$ memories which provide $P_R-1$ output index signals that represent overlapping quantized pixel groups which are aligned to columns $Y+1$ thru $Y+P_R$, wherein the reading step of said second sequence is performed on the same set of $P_R-1$ memories, and wherein the reading step of said third sequence is performed on a set of $P_C-1$ memories which provide $P_C-1$ output index signals that represent overlapping quantized pixel groups which are aligned to rows $X+1$ thru $X+P_C$.

11. A method according to claim 7 wherein the reading step of said first sequence is performed on a set of $P_C-1$ memories which provide $P_C-1$ output index signals that represent overlapping quantized pixel groups which are aligned to rows $X+1$ thru $X+P_C$, wherein the reading step of said second sequence is performed on the same set of $P_C-1$ memories, and wherein the reading step of said third sequence is performed on a set of $P_R-1$ memories which provide $P_R-1$ output index signals that represent overlapping quantized pixel groups which are aligned to columns $Y+1$ thru $Y+P_R$.

12. A method according to claim 8 wherein the reading step of said first sequence and the reading step of said second sequence and the reading step of said third sequence are all performed on one and the same memory.

13. A method according to claim 9 wherein the reading step of said first sequence and the reading step of said second sequence and the reading step of said third sequence are all performed on one and the same memory.

* * * * *